Figure 1:
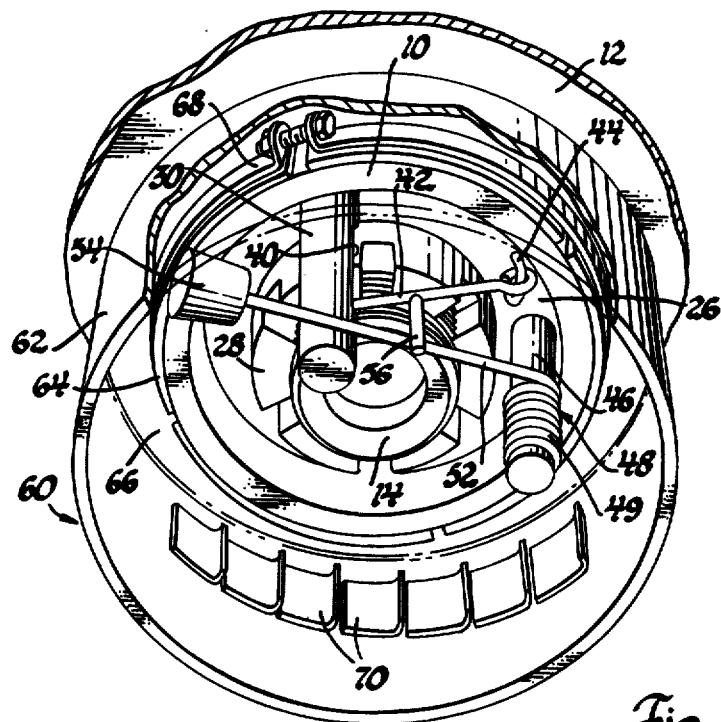

United States Patent [19]

Majernik

[11] 4,148,271

[45] Apr. 10, 1979

[54] INCIPIENT BEARING FAILURE INDICATOR

[75] Inventor: Paul M. Majernik, Hartland, Mich.

[73] Assignee: General Motors Corporation, Detroit, Mich.

[21] Appl. No.: 888,177

[22] Filed: Mar. 20, 1978

[51] Int. Cl.[2] .................... F16C 17/00; G08B 21/00
[52] U.S. Cl. ................... 116/67 R; 116/208; 308/1 A
[58] Field of Search .......... 116/114 Q, 67 R; 308/1 A; 188/1 A

[56] References Cited

U.S. PATENT DOCUMENTS

| 2,843,075 | 7/1958 | Geraghty | 116/67 R X |
|---|---|---|---|
| 3,385,256 | 5/1968 | Forbush | 116/114 Q X |
| 3,592,295 | 7/1971 | Kennel | 116/67 R X |
| 3,786,776 | 1/1974 | Buthe et al. | 116/67 R |
| 3,853,087 | 12/1974 | Aldage | 116/67 R X |
| 4,063,786 | 12/1977 | Rall | 308/1 A |

Primary Examiner—Daniel M. Yasich
Attorney, Agent, or Firm—Warren D. Hill

[57] ABSTRACT

A mechanism mounted adjacent one end of a roller bearing carries a probe biased against ends of the rollers, the probe having a shoe wide enough to span at least two rollers. A spring biased hammer is latched in a cocked condition by a latch device which is controlled by the probe. A bell or sounder rotates in a path near the hammer. When the cage of the bearing fails prior to bearing failure, the rollers bunch up forming a gap which allows the probe to drop into the gap to unlatch the hammer which swings against the bell to cause an audible indication of imminent bearing failure.

2 Claims, 5 Drawing Figures

INCIPIENT BEARING FAILURE INDICATOR

This invention relates to an apparatus for indicating that a roller bearing is about to fail.

Failure of a roller bearing in machinery can cause stoppage of the machinery at a very inconvenient time. It is desirable, therefore, to be forewarned of any impending failure in order that preventive measures can be taken at a convenient time and place.

It has been found in the case of a roller bearing having a cage to keep the rollers uniformly spaced that the cage deteriorates and fails prior to failure of the roller bearing. In fact, an automobile may be driven for several miles after cage failure prior to a wheel bearing failure.

It is, therefore, a general object of this invention to provide an indicator of imminent bearing failure which is sensitive to cage deterioration to provide an indication prior to bearing failure.

The invention is carried out by mounting a signalling or indicating mechanism adjacent the end of a roller bearing mechanism which comprises a probe having a shoe bearing against the ends of the rollers, the shoe being wide enough to span at least two rollers so that as long as the rollers are evenly spaced the probe is held outside the path of the bearings and when the cage of the bearing deteriorates and allows the rollers to bunch up, the resulting gap in the roller pathway allows the probe to drop into the path of the rollers, and an actuator responsive to the movement of the probe which triggers an alarm mechanism to provide the desired indication.

Figure 2:
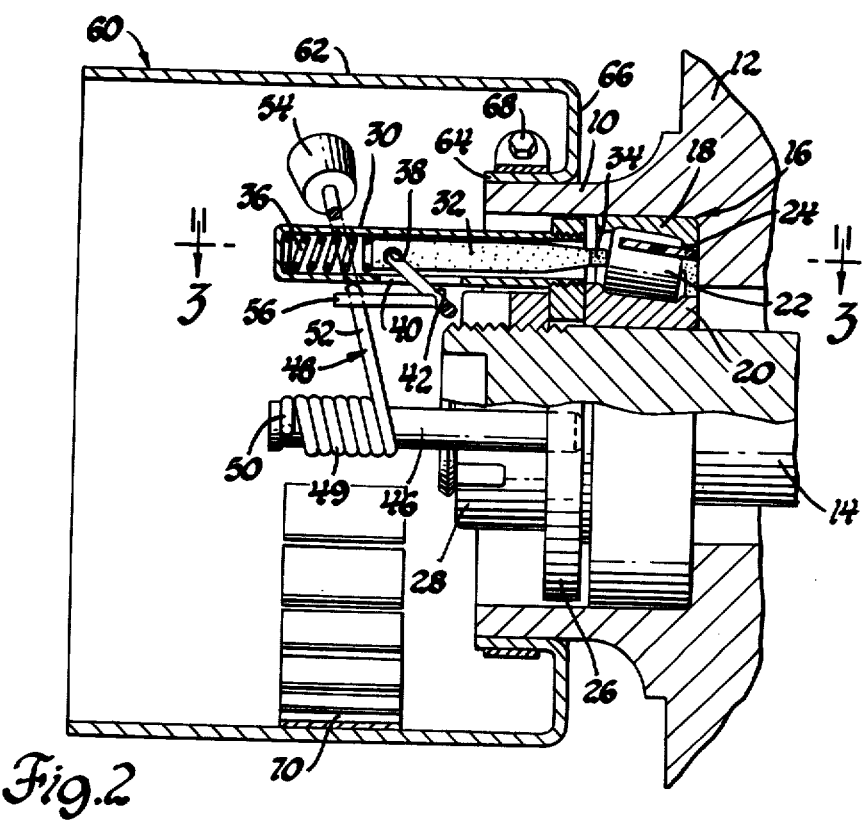
Figure 3:
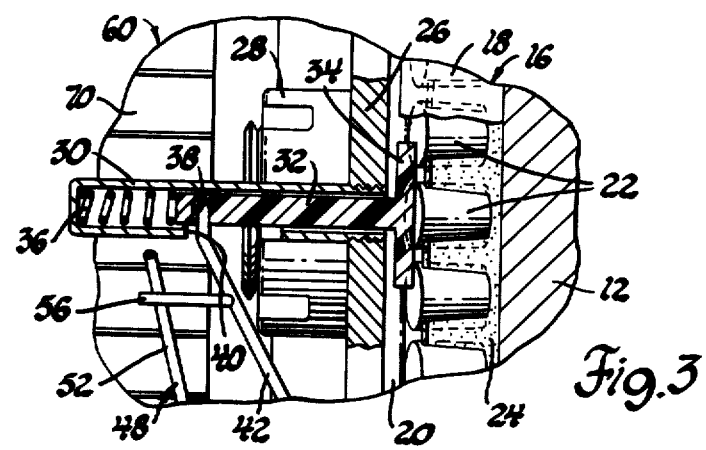
Figure 4:
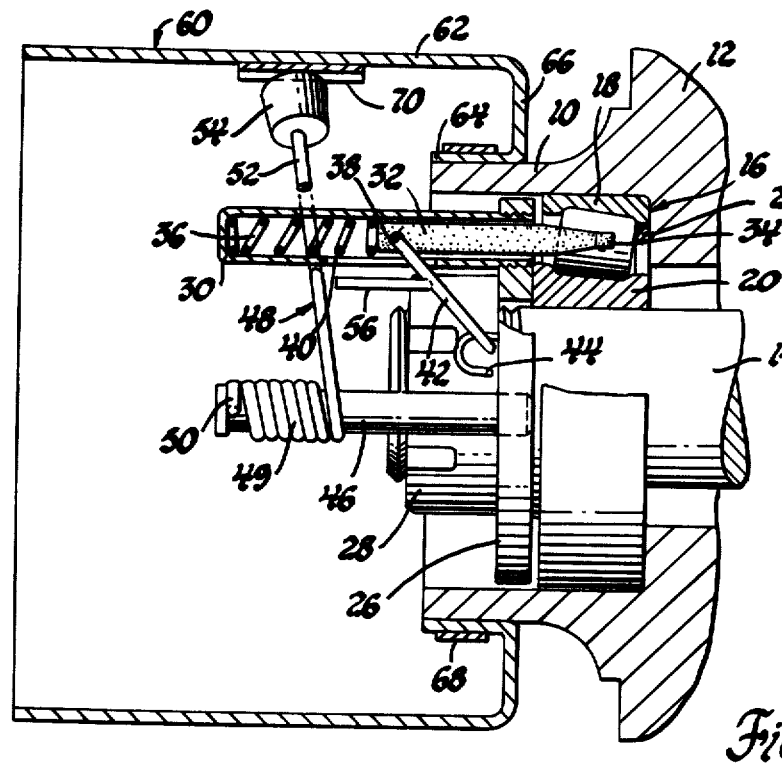
Figure 5:
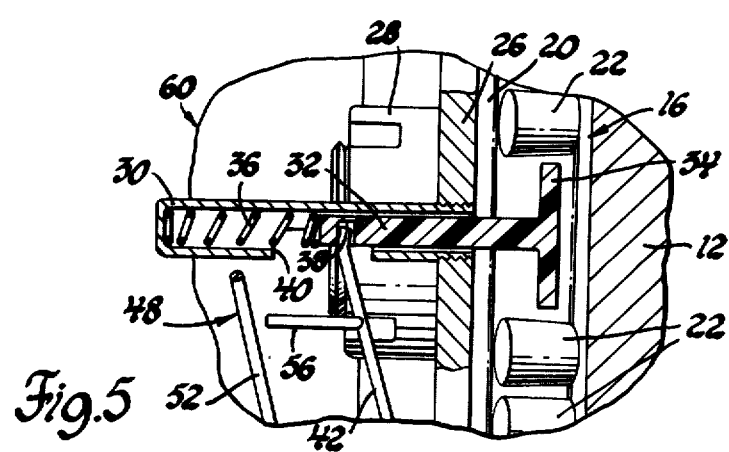

The above and other advantages will be made more apparent from the following specification taken in conjunction with the accompanying drawings wherein like reference numerals refer to like parts and wherein:

FIG. 1 is a perspective view of the bearing failure indicator according to the invention as mounted on the hub of a wheel, FIG. 2 is a cross-sectional view of a roller bearing and the failure indicating mechanism according to the invention, FIG. 3 is a cross-sectional view of the mechanism of FIG. 2 taken along lines 3—3 thereof, the mechanism of FIGS. 2 and 3 being shown in armed position and, FIGS. 4 and 5 correspond to the views of the device in FIGS. 2 and 3 respectively wherein the mechanism is shown in tripped condition to sound an alarm.

As shown in FIGS. 1, 2 and 3, the hub 10 of a wheel 12 is journaled on a stationary spindle 14 by means of a tapered roller bearing 16. The bearing 16 comprises an outer race 18 fit within a bore of the hub 10, an inner race 20 surrounding the spindle 14, a plurality of rollers 22 between the races, and a plastic or metal cage 24 which maintains uniform spacing of the rollers. A support or washer 26 bears against an end of the inner race 20 and is held in place by a nut 28 threaded on the ends of the spindle 14. The washer 26 is a part of and carries other components of the bearing failure detecting device. A hollow cylindrical sleeve 30 perpendicular to the washer 26 is threaded into an opening in the washer 26 at a location aligned with the path of the rollers 22. A probe 32, preferably of nylon, slidably carried within the sleeve 30 has a shoe portion 34, as best seen in FIG. 3, which bears on the ends of the rollers and spans at least two rollers in width so that as the rollers rotate past the probe, the shoe will ride on the end surface of the rollers. A coil spring 36 in the outer end of the sleeve 30 urges the probe 32 toward the rollers 22. A side aperture 38 in the probe 32 is aligned with a longitudinal slot 40 in the side of the sleeve 30. A latch mechanism includes a trigger arm 42 which has one end extending through the slot 40 and into the aperture 38 for movement with the probe 32 and is pivoted at its other end to a pivot mount 44 on the washer 26.

A post 46 carried by the washer 26 and extending parallel to the sleeve 30 carries a hammer assembly or actuator 48 which comprises a coil spring 49 surrounding the post 46 and having one end 50 secured to the post and the other end of the spring terminating in a long arm 52 which carries at its extreme end a hammer 54. The trigger arm 42 carries a laterally extending latch rod 56 which is positioned to interfere with movement of the arm 52 when the trigger arm 42 is in its spring loaded normal position as shown in FIGS. 1-3 of the drawings. An audible signal means or bell 60 rotatable with the hub comprises a cylindrical sleeve 62 mounted on the outside of the hub 10 by an inner sleeve 64 spaced inwardly of the sleeve 62 and connected thereto by a web 66. A hose clamp 68 securely clamps the inner sleeve 64 to the hub 10. A plurality of fins 70 are carried by the inner surface of the sleeve 62.

In normal operation the probe 32 is held in its outward position by the shoe 34 which is seated on the ends of the rollers 22. The hammer 54 is urged toward the fins 70 of the bell 60 by the coil spring 49 but the hammer is restrained from actually touching the fins by the latch rod 56 carried by the trigger arm 42. In the event the bearing runs dry of lubricant the cage 24 will deteriorate and fail. This occurs prior to failure of the bearing per se. When the cage disintegrates, the rollers are then allowed to bunch up leaving gaps wider than the width of the shoe 34. Thus, the probe 32 is no longer supported in its outer position by the rollers 22 and the probe is forced by the spring 36 into the gap between the rollers as shown in FIGS. 4 and 5. In practice the end of the probe carrying the shoe is destroyed by the action of the rotating rollers so that the failure detector or at least the probe is not reusable. In any event, the resulting motion of the probe toward the bearing 16 moves the trigger arm 42 and the latch rod 56 in the same direction to release the latch rod from the hammer arm 52. Thus, the hammer 54 is urged by its coil spring 49 against the fins 70 of the rotating bell 60 causing an audible alarm which is indicative of an incipient bearing failure. The alarm indicates to the vehicle operator that while the bearing is still operable it should be serviced sometime within the next few miles of operation.

It will be apparent that by using the probe described herein to sense failure of the bearing cage many types of alarm mechanisms other than the specific embodiment described herein may be used. For example, an electrical switch operated by movement of the probe could be used to close a circuit for energizing an electrical alarm or warning lamp.

It will thus be seen that the invention according to the subject disclosure will provide the indication of an imminent bearing failure by triggering an alarm when the bearing cage fails but before bearing failure.

The embodiments of the invention in which an exclusive property or privilege is claimed are defined as follows:

1. An incipient failure signalling indicator for a roller bearing mounted between two relatively rotating members, the bearing having elongated rollers terminating in end faces and a cage for uniformly spacing the rollers, the indicator being responsive to nonuniform roller spacing occurring upon failure of the cage, comprising a support adjacent one end of the bearing and mounted on one of the members, a probe carried by the support, the probe including a shoe member positioned against the end faces of the rollers, the shoe member being wide enough to span two rollers when they are uniformly spaced, means for urging the probe toward the rollers so that the shoe member normally rides on the end faces of the rollers as they rotate past the shoe member, whereby when cage failure allows the rollers to become spaced nonuniformly and a gap wider than the shoe member is formed between the rollers, the probe is moved into the said gap, and means responsive to the probe movement for actuating means for signalling incipient bearing failure.

2. An incipient failure signalling indicator for a roller bearing mounted between two relatively rotating members, the bearing having elongated rollers terminating in end faces and a cage for uniformly spacing the rollers, the indicator being responsive to nonuniform roller spacing occurring upon failure of the cage, comprising a support adjacent one end of the bearing and mounted on one of the members, a probe carried by the support, the probe including a shoe member positioned against the end faces of the rollers, the shoe member being wide enough to span two rollers when they are uniformly spaced, spring means for urging the probe toward the rollers so that the shoe member normally rides on the end faces of the rollers as they rotate past the shoe member, whereby when cage failure allows the rollers to become spaced nonuniformly and a gap wider than the shoe member is formed between the rollers, the probe is moved into the gap, and an indicating means having a signal means and having an actuator mounted on the said support and biased toward an actuated position, latch means mounted on said support and normally engaging the actuator for holding the actuator in a nonactuated position, the latch means including a trigger portion engaging the said probe for movement to an unlatched position when the probe is moved into the gap for releasing the actuator to its actuated position, whereby the signal means is actuated to emit an audible signal upon failure of the cage.

* * * * *